United States Patent [19]

Olesen

[11] Patent Number: 4,583,276

[45] Date of Patent: Apr. 22, 1986

[54] METHOD OF FORMING AND DRIVING STAPLES

[75] Inventor: Paul Olesen, Bellmore, N.Y.

[73] Assignee: Swingline, Inc., Long Island City, N.Y.

[21] Appl. No.: 691,050

[22] Filed: Jan. 14, 1985

Related U.S. Application Data

[62] Division of Ser. No. 506,991, Jun. 23, 1983.

[51] Int. Cl.⁴ .......................... B23P 11/00

[52] U.S. Cl. .......................... 29/432.1; 29/526 R

[58] Field of Search .................. 29/432, 432.1, 526 R; 206/338; 226/151; 227/85, 86, 87, 88, 89, 95, 98, 120, 131, 90

[56] References Cited

U.S. PATENT DOCUMENTS

| | | | |
|---|---|---|---|
| 2,964,751 | 12/1960 | Lang | 29/432.1 |
| 3,009,156 | 11/1961 | Lerner | 227/88 |
| 3,167,780 | 2/1965 | Mueller | 227/90 X |
| 3,499,592 | 3/1970 | Cooper | 29/432.1 X |
| 3,524,575 | 8/1970 | Hurkmans et al. | 227/7 |
| 3,602,414 | 8/1971 | Garfinkel | 226/151 |
| 3,690,537 | 9/1972 | Turner et al. | 227/88 |

*Primary Examiner*—Charlie T. Moon

*Attorney, Agent, or Firm*—Pennie & Edmonds

[57] ABSTRACT

A staple forming and driving tool (10) employing a vertical front portion of a staple head base (34), and sheath (40) to provide a space for reciprocating former member (70) and driver (80). Spring (50) urges base (34) toward sheath (40) with spacer lugs (33) maintaining a defined distant between base (34) and sheath (40). A belt (94) is fed through an opening (100) in base (34) by a cartridge (90) which protrudes into opening (100) and belt advancing means (104, 112) is held inoperative by forming tang (75) during a portion of the forming and driving stroke to prevent movement of staple wire (200) during critical periods of such stroke. The former (70) is moved during the forming and driving stroke through a path which permits former lugs (72) to guide the former staple down to a point adjacent the workpiece (300).

3 Claims, 22 Drawing Figures

FIG. 1
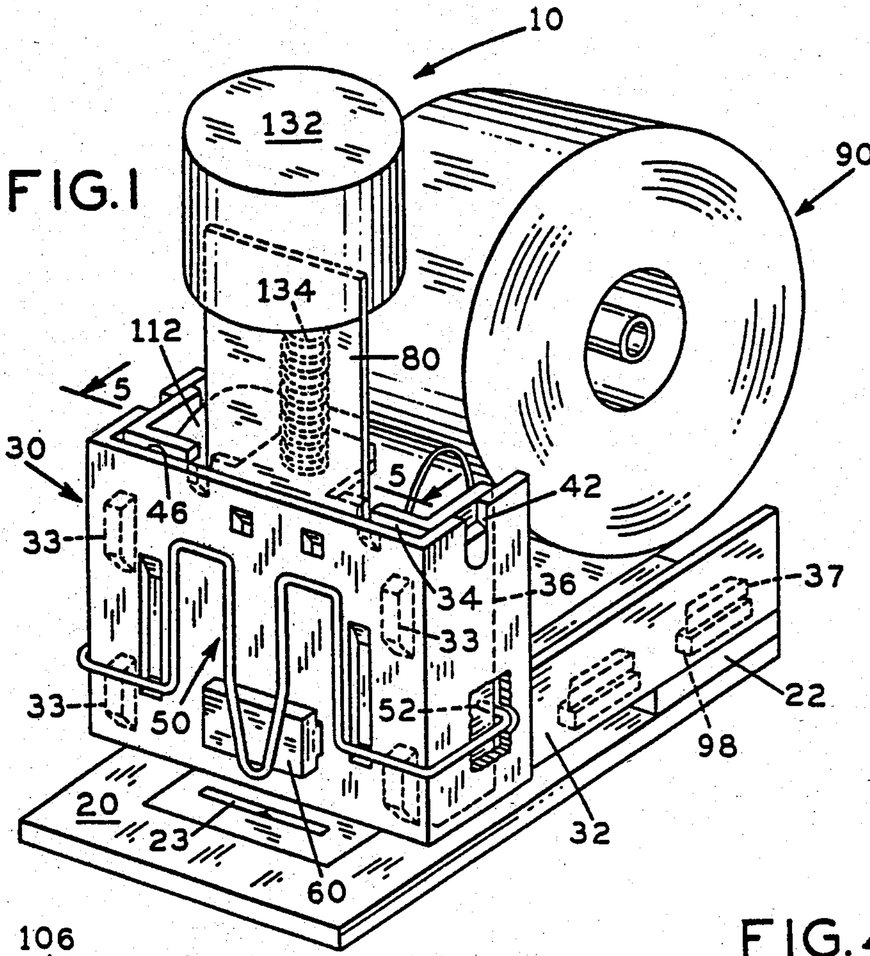
FIG. 4
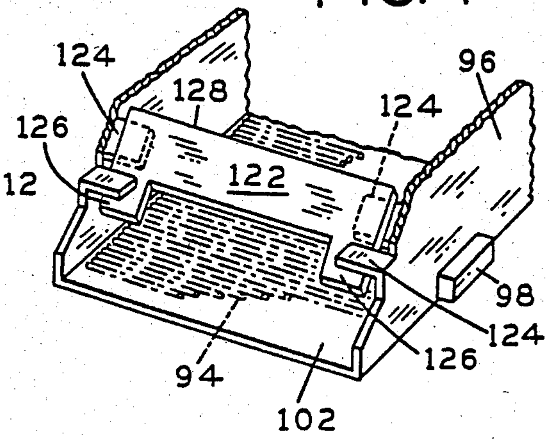
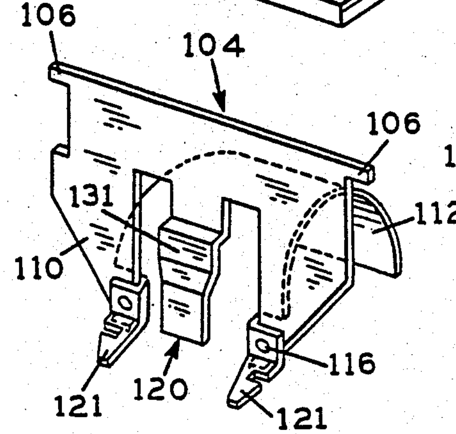
FIG. 3

METHOD OF FORMING AND DRIVING STAPLES

This is a division of application Ser. No. 506,991 filed June 23, 1983.

DESCRIPTION

TECHNICAL FIELD

This invention relates to staple forming and driving machines of the type that form a staple from a wire staple blank and drive the same. More particularly, this invention relates to such a staple forming and driving machine or stapler and its method of operation, in which the staple is formed and driven in one stroke of the operating mechanism.

BACKGROUND ART

Staple forming and driving mechanisms are known in which staples are formed and driven in one stroke. Examples of such devices are shown in U.S. Pat. Nos. 1,757,883, 2,659,885, 3,728,774 and 3,746,236, in all of which the staple is first cut from a coil of wire or a metal band, and then formed and driven. Furthermore, in all of these four patents separate linkages, levers, cams and the like connect the former and the driver to the source of power. That is, to say, except for the source of power, the former and driver have separate linkages due to the fact that the staple must be first formed and then driven. This leads to problems in that it requires a considerable number of moving parts and, further, the timing can be adversely effected with wear, such that the staple is not properly formed before driving.

In U.S. Pat. Nos. 3,009,156 and 3,690,537 staple formers and drivers are disclosed which form and drive a staple from a belt of staple blanks and which, moreover, operate the former from the driver which, in turn, is driven by the main drive source. Accordingly, in each of these U.S. Pat. Nos. 3,009,156 and 3,690,537 there is no separate linkage provided for the former and the driver but, rather, means is provided between the former and the driver so that after the staple has been formed, the former is disconnected from the driver and the driver continues on to drive the formed staple. Stated otherwise, there is a lost motion arrangement between the former and the driver. While these latter two staple formers and drivers do reduce the number of moving parts and the various linkages, they still have a very considerable number of moving parts and, in particular, the releasable connection between the former and driver is relatively complex.

Moreover, in all of such above mentioned staple former and driver devices, the number of parts with attendant pivots and the like require a relatively large housing even for driving the standard desk-type staple. Accordingly, up to the present time, most desk staplers have been of the type which merely drive pre-formed staples since the complications attendant upon forming as well as driving has heretofore involved a large number of parts, thus increasing costs both for raw materials and for assembly. Such costs have generally not been amenable to pricing such staple former and driving devices into the office market for use on desks by individuals.

Still further, with the complication of forming as well as driving, it will be appreciated that there is a greater tendency to jam the stapler. In all of the above, unjamming of the stapler can sometimes be accomplished merely by repeated strikes upon the operating knob but, at other times, some disassembly of the mechanism will be required to alleviate a jammed staple or staple blank condition.

SUMMARY OF THE INVENTION

The present invention is directed to the production of a relatively small desk-type stapler which both forms and drives the staple from a belt of staple blanks retained in a cartridge. One object of the invention is to produce such a stapler with as few moving parts as possible in order to reduce the cost and to greatly increase reliability despite possible wear of the parts.

Still further, it is another purpose of the invention to provide a staple former and driving device in which any jammed condition of a staple blank or of a partially or fully formed staple may be alleviated simply by repeated operation of the stapler.

To this end, the stapler of this invention includes a driver, a former positioned to be driven by the driver, a former block and a sheath, all of which parts are held to a stationary stapler head by means of a single spring.

The driver blade, former, sheath and stapler head have generally planar portions positioned in parallel planes and held in contact with one another by the aforementioned single spring. In the event of jamming, the spring may give permitting the sheath to move away from the fixed stapler head, thus providing space for ejection of one or more jammed staples or staple blanks. Upon correction of the jamming, the parts promptly reassume their proper position under the urging of the spring and the device is ready for proper operation once again.

A greatly simplified coupling means is provided between the driver and the former in order to provide the required lost motion. To this end, the driver blade is formed of spring steel or other flexible material and has two driver legs, one on each of the lateral sides thereof which engage laterally extending shoulders on the former in order to transmit to the former the motion of the driver caused by operation of the operating mechanism (manual knob or solenoid). Cam faces on the interior of the sheath are positioned to cam the legs thus springing them outwardly against their natural spring force to disengage the driver legs from the former shoulders after formation of the staple, so that further downward movement of the driver carries the former in frictional engagement with the driver until the former strikes the workpiece.

BRIEF DESCRIPTION OF THE DRAWINGS

FIG. 1 shows a perspective view of the staple former and driver of this invention;

FIG. 3 shows the feed fingers for feeding the belt of staple blanks to the stapler former and driver;

FIG. 4 shows a portion of the cartridge including the anti-retract mechanism;

BEST MODES FOR CARRYING OUT INVENTION

Figure 2:
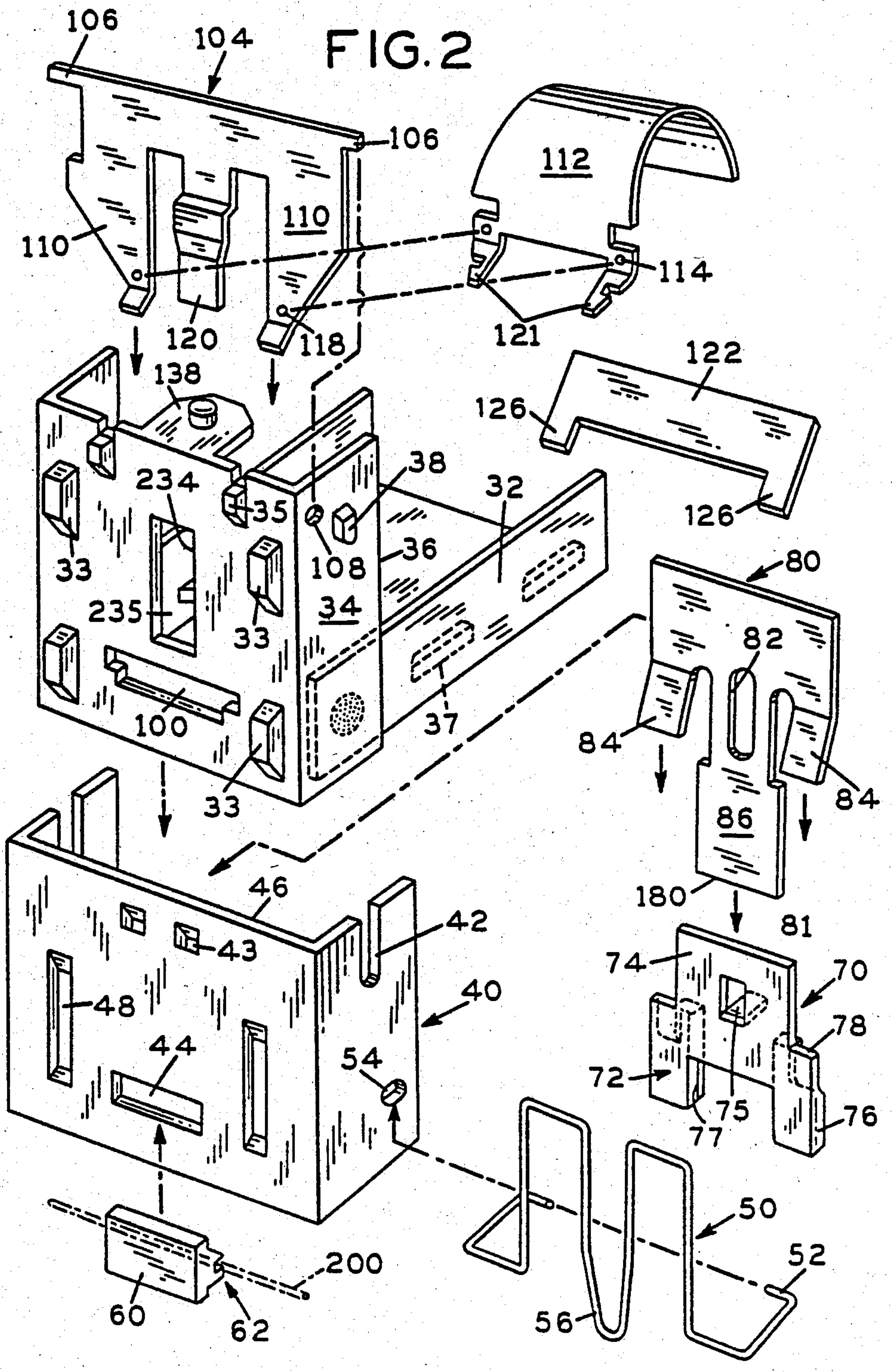
FIG. 2 is an exploded view of the stapler of FIG. 1 with certain parts not shown.

As shown in FIGS. 1–4, the staple former and driver 10 comprises a base 20 to which is secured a staple head 30. As shown, the staple head 30 comprises a base portion 32 and an upright front portion 34. The base portion 32 is welded or otherwise secured at its rearward end to an upright 22 extending upward from the base 20. This securement of the staple head 30 is shown merely by way of an example, other means of securing the staple head 30 in fixed relationship to the base 20 may be utilized. A front sheath 40 is secured to the stapler head 30 for vertical movement with respect thereto by means of a spring clamp 50. Each end of the spring clamp 50 is bent inwardly to provide inwardly projecting legs 52 which pass through openings 54 on opposite sides of the front sheath 40. The legs 52 extend toward each other somewhat, a distance sufficient to engage behind the rearward edge 36 of the front portion 34 of the staple head 30. Laterally extending ears 38 on either side of the staple head are embraced by U-shaped slots 42 on either side of the front sheath 40. Forwardly extending spacer lugs 33 formed integrally with the front portion 34 of the staple head 30 bear against the inner surface 46 of the front sheath 40 to hold the same in fixed spaced relationship to the front portion 34 of the staple head 30.

Centrally located in front sheath 40 is an elongated rectangular opening 44 which receives the nose portion 62 of a former block 60. The spring clamp 50 has a downwardly bent generally V-shaped portion 56 which bears against the outer surface of the former block to maintain the same resiliently in position as shown in FIG. 1. In the space between the staple head 30 and the front sheath 40 provided by the spacer lugs 33 are positioned a former member 70 for forming a staple from a short piece of wire and a driver 80. The former 70 lies against the inner surface 46 of the front sheath 40 and is positioned between two elongated vertical guideways 48 extending inwardly toward the staple head 30 from the front sheath 40. These guideways 48 may be punched or otherwise formed from the same material as the front sheath 40. The former 70 is of generally inverted U-shape having two downwardly extending legs 72 which are generally thicker than the upper portion 74 of the former. The outer surfaces 76 of the legs 72 bear against the adjacent facing surface 47 of the guideways 48. At its upper end, the former 70 is reduced in width in the area of the central member 74, thus providing two lateral upwardly facing shoulders 78. The central portion 74 includes a tang 75 cut from the material of the former 70 and bent rearwardly to extend through a vertical slot 82 in the driver 80.

Figure 5:
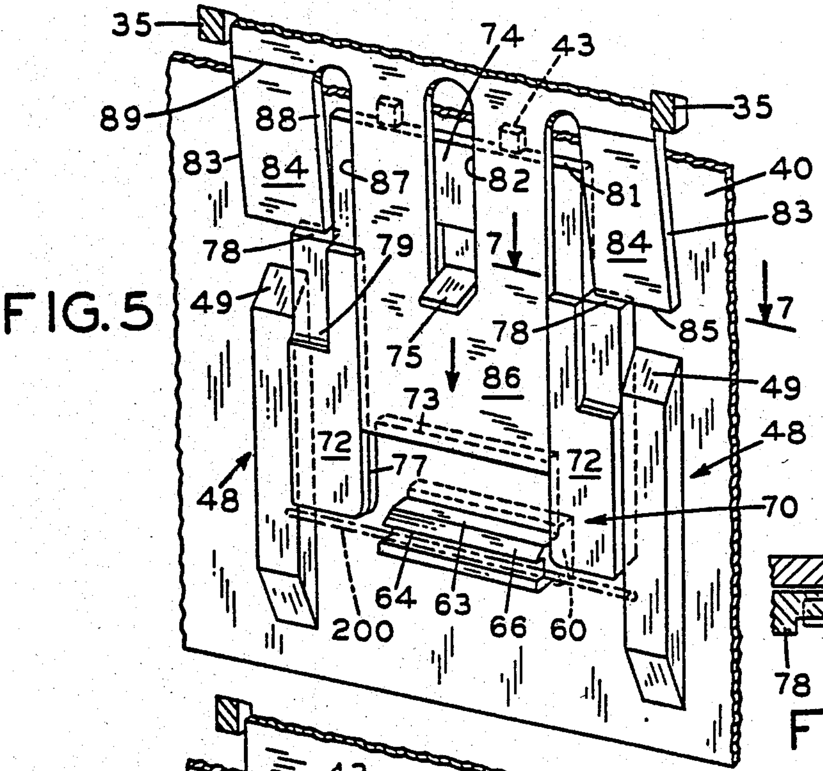
FIG. 5 is an enlarged view taken along the line 5—5 of FIG. 1, showing the parts at the beginning of a cycle of operation.
Figure 7:
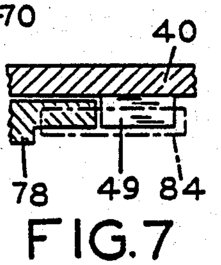
FIG. 7 is a view taken along the line 7—7 of FIG. 5.

Referring to FIG. 5, the driver includes two lateral pusher elements 84 separated from the driver blade 86 by slots 88. The pusher elements 84 are bent slightly along the lines 89 to extend forward and bear against the inner surface 46 of the front sheath 40. The edges 85 of the pusher elements 84 are, therefore, normally in alignment with the upwardly facing shoulders 78 on the former member 70. The outer portions of the edges 85 are in alignment with sloped cam surfaces 49 on guideways 48, which cam surfaces 49 face toward the outer portions of the edges 85.

Each of the legs 72 of the former 70 in an area just below the upwardly facing shoulders 78 has a recess portion 79. Each of the legs 72 also has along its inwardly facing edge a groove 77, which grooves 77 together form a raceway to assist in forming and driving the staple. The outer laterial edges 87 of the driver blade 86 are convex to fit within the curved cross-section of the raceway forming grooves 77.

In addition to the spacer lugs 33, the front portion 34 of the staple head has two forwardly projecting combination guide lugs 35 positioned on either side of the driver blade 80 to assist in guiding the same during its vertical movement. These are shown broken away from the front portion 34 in FIGS. 5 and 6 in which figures the front piece 34 is not shown. It will be seen that the opposite side edges 83 of the driver blade 80 slidingly engage the inner surfaces of these guide lugs 35.

Extending rearwardly from the surface 46 of the sheath 40 are two stop lugs 43 which engage the upper edge 81 of the former 70 on the return stroke to limit its upper movement. These stop lugs 43 also bear against the front face of the driver blade 80 lightly, in order to lend rigidity thereto during operation.

Figure 9:
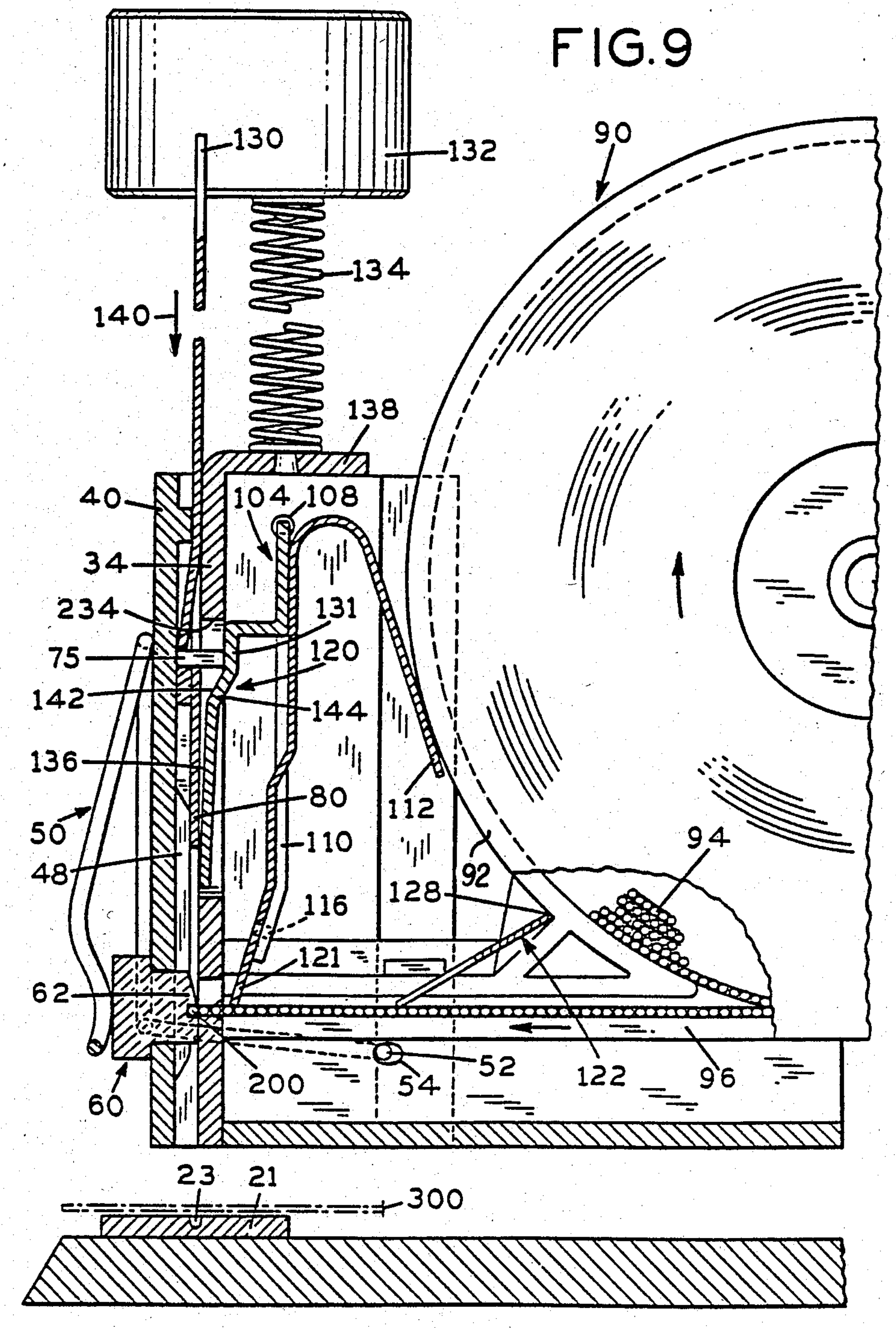
FIG. 9 is a vertical cross-section through part of the stapler of FIG. 1, showing the parts at the beginning of a cycle of operation.

The stapler is constructed to accept a cartridge 90 comprising a housing 92, only portions of which are shown (see FIG. 9). The cartridge carries within it a roll 94 of short lengths of wire secured together in belt fashion and exiting through a chute 96 at the bottom of the housing. As shown in FIGS. 1 and 4, the chute 96 has laterally projecting ears 98 engaged beneath inwardly projecting lugs 37 on the bottom member 32 of the staple head. This engagement between the ears 98 and the lugs 37 insures proper alignment of the outlet 102 of the chute 96 with an opening 100 in the front portion 34 of the staple head 30. Suitable fastening means, not shown, secures the housing 92 to the staple head 30.

Mounted inside front portion 34 is a feed finger plate 104 having laterally extending ears 106 fitting loosely in openings 108 in the front portion 34 (see FIGS. 2 and 9). This feed finger plate 104 has two depending members 110, one on either side thereof. A spring steel feed spring 112 is secured to the feed finger plate 104 by means of two rivets 116 passing through two openings 114 in the feed spring 112 and cooperating openings 118 near the bottom of each of the depending members 110 of the feed finger plate 104. Between the depending members 110 is an actuating tongue 120 extending downwardly and somewhat forwardly of the depending members 110. In the assembled condition of the parts shown in FIG. 9, the rearwardly extending tang 75 on the former 70 bears against the depending tongue 120 to activate the feed finger plate and feed spring 112 to feed staple wires 200 as hereinafter described. The feed spring 112 terminates in two fingers 121 which bear against the staple wires 200 in the belt 94 as shown in FIG. 9. Loosely mounted in the chute 96 (see FIG. 4) is an anti-retraction plate 122 held in place by lugs 124 and positioned largely by gravity and having two depending fingers 126 resting upon the staple wires 200 in the belt 94. The rearward edge 128 of the antiretraction plate 122 bears against a portion of the housing 92 in order to prevent the staple wires 200 from moving backward toward the cartridge.

The upper end 130 of the driver blade 80 is secured within the operating knob 132 and a retraction spring 134 extends between the knob 132 and a rearwardly extending flange 138 is integral with front portion 34. The retraction spring 134 urges the knob 132 and the upper blade end 130 in the upward direction opposite to that indicated by the arrow 140 in FIG. 9.

The base 20 has an anvil 21 secured thereto on its upper surface, which anvil 21 has a pair of clinching grooves 23 in alignment with the driver blade 80.

At the beginning of a cycle of operation, the retraction spring 134 is at its most fully expanded condition, the operating knob 132 is at its upward position as shown in FIG. 9 as is the driver blade 80. The lead staple wire 200 is positioned in a groove 64 in the nose 62 of the former block 60. The former 70 is in its most extreme upward position with its upper edge 81 engaged beneath the stops 43. Rearwardly extending tang 75 on the former 70 is close to or lightly bearing against the depending tongue 120 of the feed finger plate 104 in an area thereof indicated at 131 in FIG. 9.

Upon one swift operation of the operating knob 132 downwardly, a staple wire 200 is formed and driven while the feed spring 112 and feed fingers 121 are cocked to deliver the next staple wire 200 to the groove 64. Upon release of the knob 132, the parts rapidly reassume their position as just described and as shown in FIG. 9, and, in doing so, a new staple wire 200 is delivered to the groove 64.

More specifically, the operation is as follows:

1. Upon initial depression of the knob 132, the driver blade 80 is moved downwardly in the direction of the arrow 140. Almost immediately after travelling perhaps only 0.001" more or less, the lower edges 85 of the driver legs 84 on the driver blade 80 contact the upwardly facing shoulders 78 on the former 70. Continued movement of the blade 80 under the force applied by the knob 132 now carries the former blade 70 downwardly as well.

To the rear, promptly upon downward movement of the former 70, the tang 75 begins to move along the sloped cam surface 142 on the depending tongue 120 and begins to move the tongue 120 rearwardly about its pivot 108 against the urging of the curved feed finger spring 112.

2. Very shortly after the former 70 begins to move downward under the force applied thereto by the driver blade 80 through the driver legs 84, the lower edges of the legs 72 on the former come into contact with the lateral ends of the staple wire 200 being held in the groove 64 of the former block.

3. Further downward movement of the former 70 as it is driven by the driver blade 80 begins to break the lateral ends of the staple wire 200 loose from the associated belt 94 of staple wires 200 secured together by an adhesive or other known means such as tape. Simultaneously, the legs 72 of the former begin to bend the lateral ends of the staple wire 200 downwardly.

4. The force applied through the former legs 72 to the lateral ends of the staple wire 200 is resisted by the inertia of block 60 and sheath 40 and by the pressure applied thereto by spring 50. Accordingly, the lateral ends of the staple wire 200 are bent downwardly smoothly and continuously by the downward movement of the legs 72. During this movement, the legs become positioned in the raceways 77 in the legs 72. Shortly after the staple is formed to its U-shape, the bight or edge 73 of the former comes into contact with the top surface 63 of the nose 62 of the former block 60. Continued movement of the former 70 downwardly under the force applied thereto by the driver blade 80 now pushes the block 60 downward as well. Since the block 60 is fitted within an opening 44 in the sheath 40, the sheath 40 will be moved downwardly with the block 60. During this movement, the ends 52 of the spring clamp 50 ride downward along the rearward edge 36 of the staple head 30. However, the resistance to downward movement applied by the spring 50 in this arrangement is not great and may or may not be sufficient to hold the block 60 and sheath 40 in their up position during forming of the staple. To a considerable degree, this will depend on the strength and stiffness of the staple wire 200. It will also depend in part on how firmly the staple wire 200 is secured to the next succeeding staple wire 200 in the belt 94. Accordingly, very little, if any, bending of the ends of the staple wire 200 under the force applied thereto by the legs 72 may take place before this force is transmitted to the block 60 and the front sheath 40 causing them to move downwardly until the front sheath 40 comes into contact with the workpiece 300 resting on the anvil 21. Depending upon the interplay of the various frictional forces, this movement downwardly of the block 60 and front sheath 40 may occur even before there is actually any bending of the lateral ends of the staple wire 200; or it may take place during the bending since the frictional forces increase as the lateral ends are formed and come to rest within the raceways 77 formed in the depending legs 72; or (as is normally the case) it may not occur until the bight 73 comes into contact with the surface 63 of block 60 after formation of the staple.

To the rear, during downward movement of the former 70, the tang 75 passes along the cam surface 142 of the tongue 120 and over a bend 144 therein to a flat area 136. Once the tang 75 has reached the area 136, no further backward or cocking movement of the tongue 120 takes place but, rather, the cocked position is maintained. This cocking action of the tongue 120 under the urging of the tang 75 must be completed before the driver legs 84 on the driver 80 come into contact with the cams 49 on the upper ends of the guide ways 48 as hereinafter described. If this cocking action were not completed before the bottom edges 85 of the legs 84 reach the cams 49, there would not be enough pressure applied to the former 70 by the driver 80 to insure cocking of the tongue 120 as described. This rearward movement of the tongue 120 carries with it to the rear the depending members 110 and the feed fingers 121 which rest upon the belt 94 of staple wires 200. This movement backward is very slight being only approximately the thickness of one staple wire and less than twice such thickness. This rearward position is maintained until release of the knob 132 as described hereinafter. During this rearward motion of the tongue 120, the anti-retraction plate 122 insures that the belt 94 does not retract, thus permitting the feed fingers 121 to get a grip on one additional staple wire 200 rearward of its previous position.

5. Since the distance between the top surface 63 of the former block 60 and the bottom end of the sheath 40 is substantially the same as the distance between the bight 73 and the bottom ends of the legs 72 of the former 70, the sheath 40 and the bottom ends of the legs 72 normally come into contact with the workpiece 300 substantially simultaneously. If, however, the interplay of the frictional forces are such as described above, in which the sheath 40 comes into contact with the workpiece 300 before the former 70 has completed its downward motion, then, once the sheath 40 does contact the workpiece 300, the former 70 will continue to move downwardly forming the staple 200, and then sliding downwardly along the sides of the staple until the bottom ends of the legs 72 also strike the workpiece 300. Just before the ends of the legs 72 come into contact with the workpiece 300, the bottom edges 85 of the driver legs 84 begin to ride upwardly on the cams 49 causing legs 84 to move rearwardly against their natural spring pressure caused by the bend lines 89. This causes legs 84 to disengage from the upwardly facing shoulders 78 and to slide frictionally along the surface 79 of the legs 72. The thickness of the legs 72 in the area of the surfaces 79 is equal to the thickness of the guide ways 48 so that the driver legs 84 may slide downwardly along the guide ways 48 while maintaining contact with the surfaces 79 on the former legs 72, thus causing the former 70 to complete the last small increment of its movement downward into contact with the workpiece 300.

6. Further movement downwardly of the driver 80 with the bottom edges 85 of the driver legs 84 in frictional engagement with the surface 79, maintains the former legs 72 in contact with the workpiece 300 while the driver legs 84 move downwardly along the surfaces 79 and also along ways or ribs 48. Up until the point where the drive blade 80 begins to move downward relative to the stopped former 70, the tang 75 on the former 70 has been positioned in the bottom or relatively close to the bottom of slot 82 in driver 80. Now as the blade 80 moves downwardly, the slot 82 moves downwardly relative to the stopped tang 75. During this movement, the bottom edge 180 of the driver blade 80 strikes the bevelled upper corner 66 of the former block 60, thus forcing the former block outwardly with respect to the front sheath 40 and against the urging of the center portions 56 of the spring 50. This releases the now formed staple from the former block 60; however, the legs of the staple still reside in the raceways 77 formed by the former legs 72.

7. Promptly upon the former block moving outwardly, the bottom edge 180 of the driver 80 passes thereby and strikes the crown of the now formed staple, driving the same downwardly through the workpiece whereupon the ends are crimped by the grooves 23 in the anvil 21 in known manner. During this final driving of the staple, the raceways 77 guide the staple and the driver 80.

8. Upon completion of the downward stroke, the sheath 40 and former legs 72 are in their extreme downward position bearing against the workpiece while the driver blade 80 is bearing against the crown of the now driven staple. Upon release of the operating knob 132, the spring 134 urges the knob 132 upwardly in a direction opposite to that indicated by the arrow 140. This upward movement of the knob 132 carries with it the driver blade 80.

During upward movement of the blade 80, the slot 82 therein also moves upwardly with respect to the tang 75 on the former 70. When the bottom edge of the slot 82 engages the tang 75, further upward movement of the blade 80 under the forces applied by the spring 134 will carry with it the former 70. At some point during the upward movement of the blade 80 and the former 70, the sheath 40 and the former block 60 will begin to move upwardly as well. The particular point at which the sheath 40 and the former block 60 move upwardly will depend upon the interplay of the various frictional forces. Also due to the frictional engagement of the driver legs 84 against the surfaces 79 of the former legs 72 together with the frictional engagement of the edges 87 of the driver blade 80 and raceways 77, the former 70 may begin its upward movement at the same time as the upward movement of the driver blade 80, even though the tang 75 is still positioned at the upper end of the slot 82. It is of no consequence in what sequence the driver 80, former 70, former block 60 and sheath 40 commence their upward movement, or whether they do so simultaneously. Indeed, as the frictional forces vary, some parts, such as the sheath 40 and block 60, may start to move upwardly and then stop for a time. It is only necessary that all of the parts resume their initail position and the parts are designed and interfitted, as shown, to accomplish this purpose. For example, if the former 70 continues to move upwardly with the driver blade 80, eventually it will either be stopped by the internal frictional forces or its upper edge 81 will come up against stops 43 on the interior of the sheath, in which case further upward movement carries with it the sheath 40 unless the sheath 40 has already been returned to its normal position by the spring 50, in which latter case the stops 43 will arrest further upward movement of the former 70, and further upward movement of the driver blade 80 will cause relative movement of the slot 82 upwardly with respect to the tang 75 on the former 70. If, on the other hand, the frictional forces are such as to arrest the upward movement of the former 70 before it reaches its upper limit, then, in that event, upward movement of the blade 80 moves the slot 82 upwardly relative to the tang 75 until the bottom edge of the slot 82 engages the tang 75, whereupon further upward movement of the blade 80 also carries the former 70 upwardly.

9. At some point during the upward movement of the driver blade 80, the driver legs 84 will pass upwardly along cam surfaces 49 at the upper end of the guide ribs or ways 48, and as soon as the former blade 70 is arrested, either by the frictional forces or the stops 43, the blade 80 will begin to move upwardly with respect to the former 70, causing the slot 82 to move relative to the tang 75 and also causing the driver legs 84 to move upwardly along and relative to the surfaces 79 of the former 70 until they pass upwardly beyond the shoulders 78 and resume their position bearing against the inner surface 46 of the sheath 40. It will be appreciated that because the driver blade 80 is of spring steel, the driver legs 84 spring back into their initial position as shown in FIG. 5, in which position they are very slightly spaced upwardly from the shoulders 78.

10. Ultimately all upward movement of all of the parts is completely arrested when the driver 80 reaches the tab 75 of the former 70 and forces the edge 81 of the former 70 against lugs 43 of front sheath 40. Just prior to reaching the point, the tab 75 moves along the sloped portion 142 of the depending tongue 120 and onto the flat area 131, whereupon the feed fingers 121 feed another staple blank into the notch 64 in the block 60, the block 60 having shortly prior thereto returned to its normal inward position when the driver blade 80 has passed upwardly past the opening 44 in the sheath 40.

When staple wires 200 are fed into block groove 64 the end of wires 200 abut guideways 48 to limit their movement and properly position them in groove 64 (see FIG. 5). The feeding of staple wires 200 to block 60 is such that wires 200 are not urged toward block 60 during that portion of the downward stroke when the lead wire 200 is first contacted by former member 70 and broken away from the belt 94. This sequence prevents undesired movement of wires 200 at this point in the driving stroke.

Figure 14:
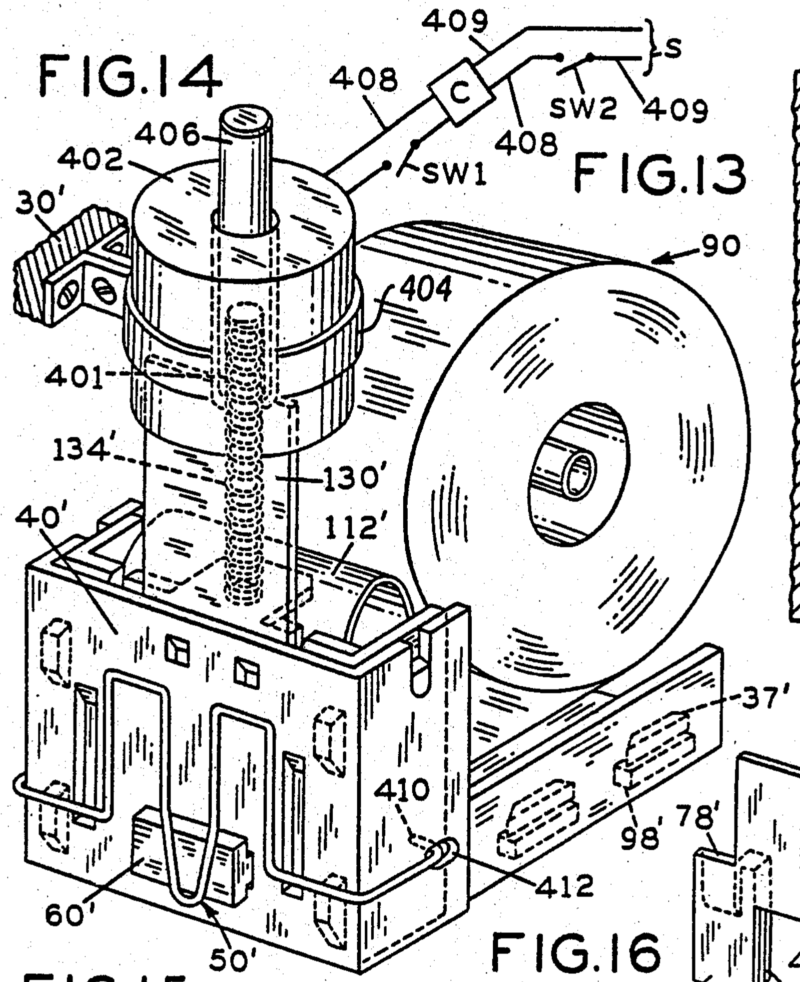
FIG. 14 is a perspective view similar to FIG. 1, but showing a modified form of stapler.
Figure 13:
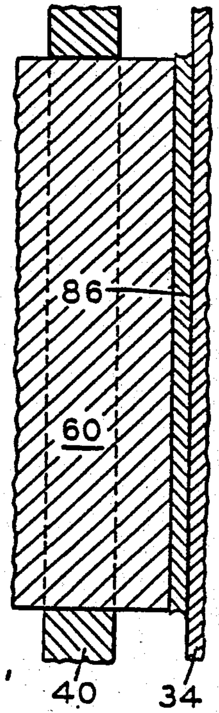
FIG. 13 is an enlarged view taken along the line 13—13 of FIG. 11.
Figure 16:
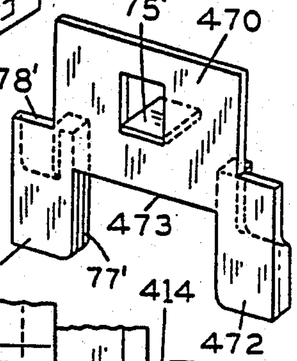
FIG. 16 shows the former member of the modified stapler of FIG. 14.
Figure 15:
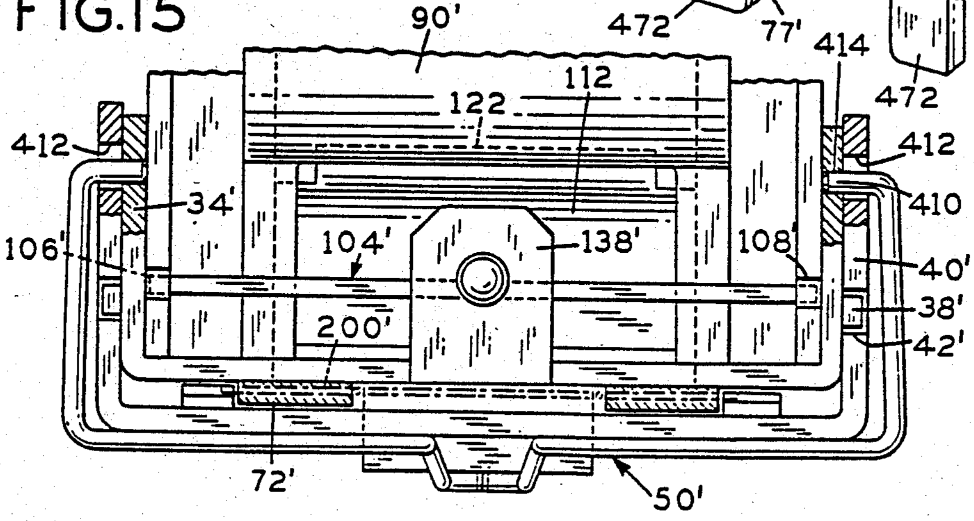
FIG. 15 is a view similar to FIG. 12, but showing the modified stapler of FIG. 14.
Figure 17:
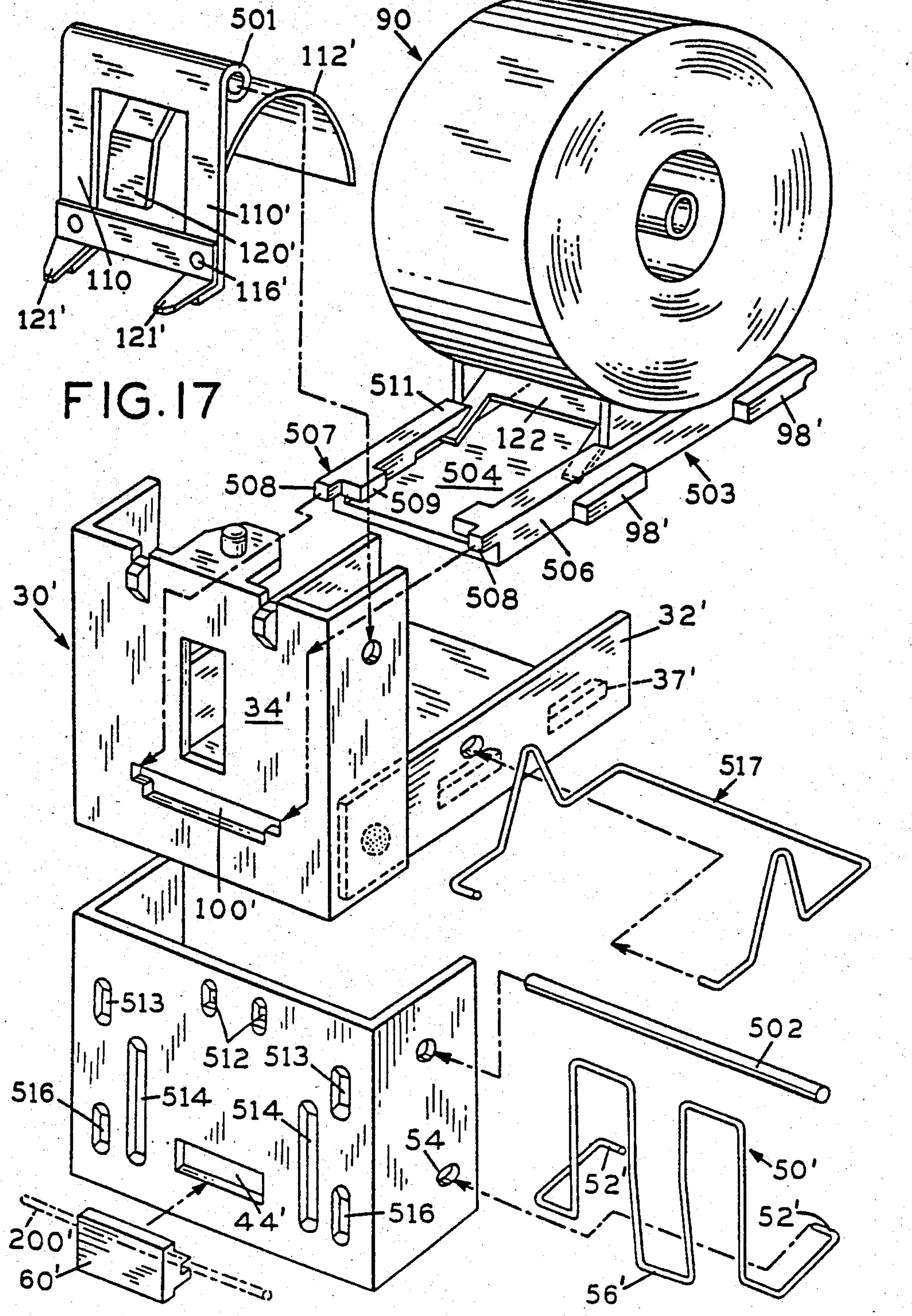
FIG. 17 is a perspective view similar to FIGS. 2 and 3 showing a further embodiment of the stapler.

In FIGS. 14, 15 and 16 there is shown a modified embodiment of the staple former and driver of this invention. Most of the parts of the staple former and driver 400 shown in FIGS. 14, 15 and 16 are identical to those for the staple former and driver 10 shown in FIGS. 1 through 13 and, as such, similar parts carry the same reference numerals. The primary difference between the stapler 400 and the stapler 10 is that the stapler 400 is operated by an electrical solenoid 402 positioned generally where the operating knob 132 is positioned in the stapler 10 of FIGS. 1 through 13. The solenoid 402 is secured to the stationary frame or stapler head 30′ by means of a strap 404 or the like, in order to maintain the solenoid 402 in fixed position. The driver blade 130′ carries at its upper end an armature 406 passing through the solenoid 402. Accordingly, upon actuation of the solenoid 402 by the switch SW1, the armature 406 will be drawn downwardly driving the driver blade 130′ downwardly to form and drive a staple. Spring 134′ is mounted in a recess 401 in the armature 406 for compactness of design.

The solenoid 402 is connected by leads 408 (in one of which there is located an actuator switch (SW1) to a suitable electric circuit C. The circuit C, in turn is connected by leads 409 (in one of which is located a main on-off switch SW2) to a source S of electrical power, such as an alternating current source. The circuit C is of known and conventional design and, accordingly, is not detailed here. One suitable circuit is disclosed in U.S. Pat. No. 3,971,969, issued July 27, 1976.

In addition to the changes mentioned above, i.e. the use of solenoid 402, the staple former and driver 400 also differ from the staple former and driver 10, in that the spring 50′ has its ends 410 extending through an elongated slot 412 in the sheath 40′ and then into a snugly fitting hole 414 on either side of the vertical member 34 of the staple head or frame 30′. The elongated slot 412 in the sheath 40 of the stapler of FIGS. 14 through 16 differs from the hole 54 in the sheath 40 for the stapler of FIGS. 1 through 13 only in being positioned closer to the front face of the sheath. In this position, the ends 410 of the spring 50′ fit into the holes 414 in the vertical portion 34′ of the staple head 30′ rather than being engaged behind the edge 36 of the vertical member 34 of the staple head 30 as in the stapler 10. It will be appreciated that, due to this arrangement, the ends 410 of the spring 50′ can no longer slide up and down the rearward edge 36 of the vertical member 34 as in the embodiment of FIGS. 1 through 13. Accordingly, unlike the embodiment of FIGS. 1 through 13, the sheath 40′ of the electrically operated stapler 400 does not move downwardly against the workpiece 300 during operatin. Rather, the sheath 40′ remains stationary with respect to the staple head 30′ during all phases of normal operation of the stapler 400.

Figure 6:
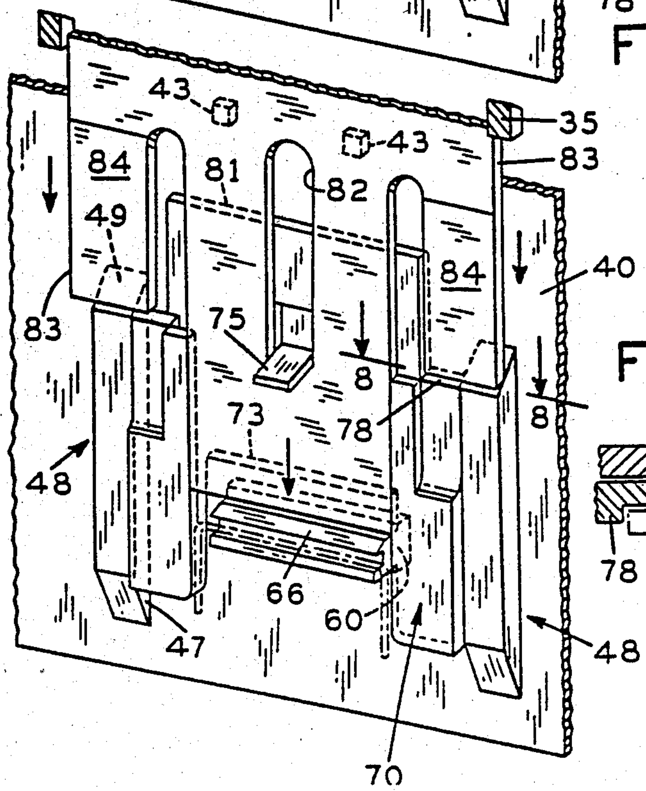
FIG. 6 is like FIG. 5, but showing the parts at one point during the cycle of operation.
Figure 8:
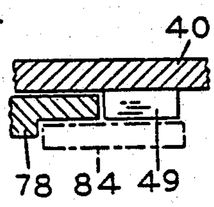
FIG. 8 is a view taken along the line 8—8 of FIG. 6.
Figure 10:
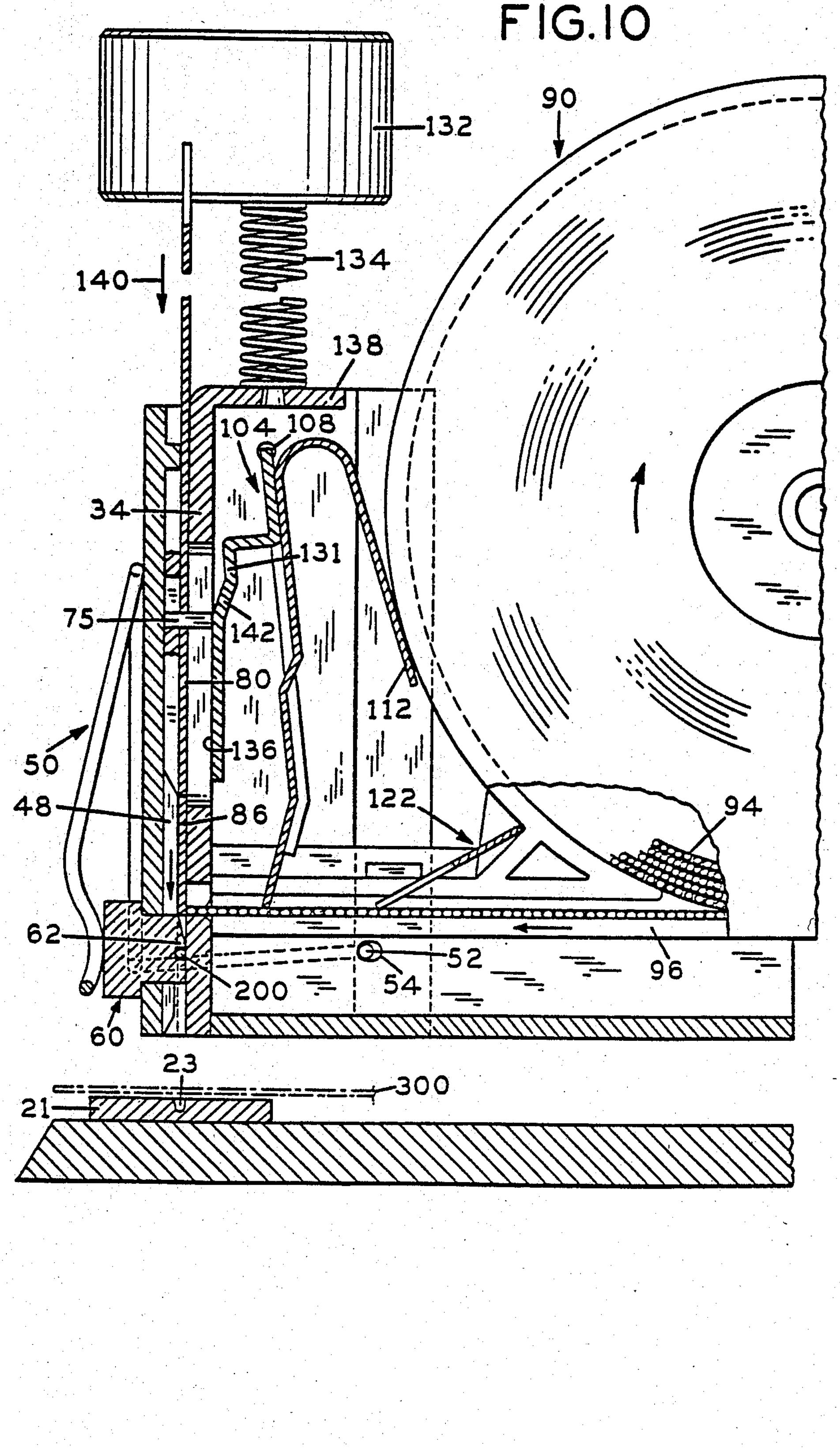
FIG. 10 is a view like FIG. 9, showing the parts at one point in the cycle of operation.
Figure 11:
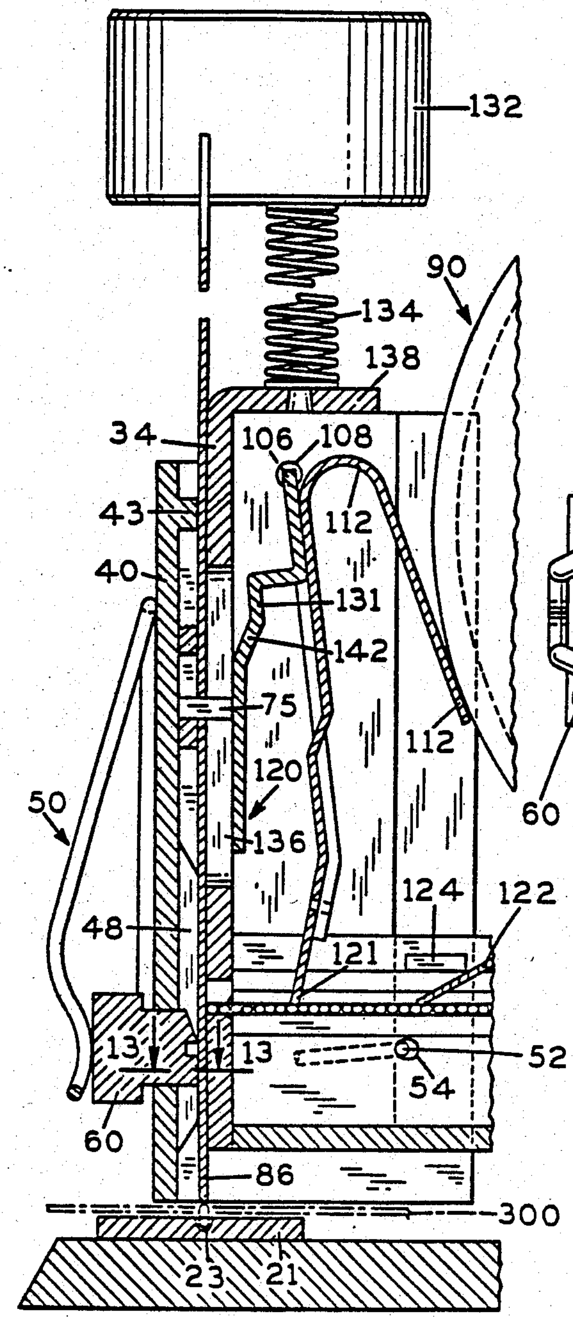
FIG. 11 is like FIGS. 9 and 10, showing the parts after the staple has been driven.
Figure 12:
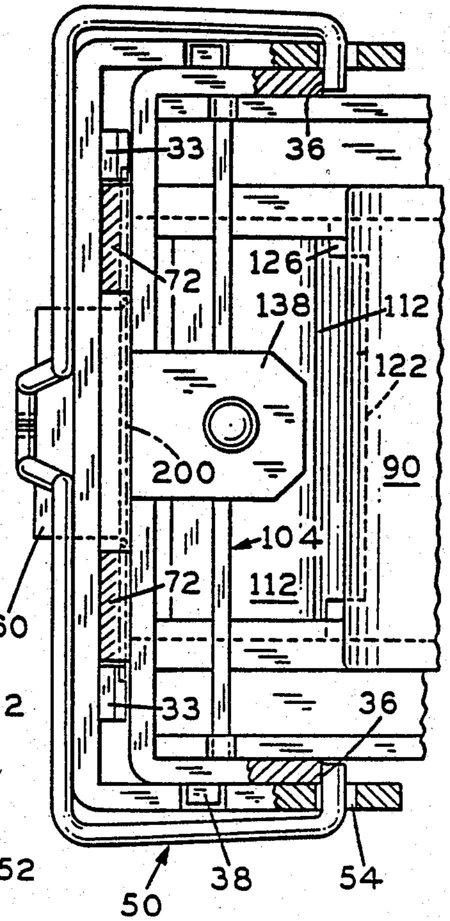
FIG. 12 is a plan view with parts broken away.

It will be recalled that in the embodiment of FIGS. 1 through 13 during operation, the legs 72 of the former 70 shape the staple from a staple blank 200 in cooperation with the former block 60. Further, it will be recalled that after having formed the staple, the bight or edge 73 of the former 70 which extends between the legs 72 comes down upon the former block 60, as shown in FIG. 10, and forces the former block 60 and the sheath 40 down until the sheath 40 bears against the workpiece 300. Since now in the staple 400, the sheath 40′ is secured against downward movement, the former 70′ must be modified. Accordingly, as shown in FIG. 16, the former 470 is shown in which the only difference from the former 70′ shown in FIGS. 2, 5 and 6, is that the bight or edge 473 of the former 470 in FIG. 16 is positioned higher than the edge 73 of the former 70′. That is, to say, that the distance from the bottom edge of the legs 472 to the bight or edge 473 of the former 470 of FIG. 16 is greater than the distance between the bottom edge of the legs 72 to the bight or edge 73 of the former 70 shown in FIG. 6. Accordingly, during operation of the device, the legs 472 may form the staple from the staple wire 200 and continue on until the bottom ends of the legs 472 come into contact with the workpiece 300 without the edge 473 reaching or contacting the former block 60′.

Pusher elements 85′ of driver 80 and recess 79 of former 70′ are shaped and proportioned so that upon completion of the forming step the former 70′ including legs 72′ continue downward due to frictional engagement of element 85′ against recesses 79′ to carry and guide the formed staple down to and against the workpiece 300.

Except as noted in the immediately preceding paragraphs, the operation of the device of FIGS. 14 through 16 is in all essential respects the same as the operation of the modification of FIGS. 1 through 13.

In each of the above described embodiments, the ends 52′, 410 of the spring 50′ fit within elongated holes 54′, 412 in the sheath 40′. Because of this fitting through the holes 54′, 412, the sheath 40′ may move outwardly away from the fixed stapler head 30′ a short distance, which distance is determined by the elongated holes 54′, 412 with respect to the diameter of the ends 52′, 410 respectively. This elongation is chosen to be sufficient to permit adequate movement of the sheath 40′ away from the stapler head 30′ for the ejection of a malformed staple or staple blank that may jam the machine. Accordingly, in order to relieve a jammed condition of the stapler, it is only necessary to operate it several times in quick succession until the jammed condition is alleviated. Thereupon, the spring 50′ will force the sheath 40′ back into its proper position relative to the fixed head 30′.

Referring to the further embodiment of FIGS. 17–22, employing numerals similar to those earlier used for some parts and new numerals for others, feed spring 112′ is connected to depending members 110′ through rivets 116. Depending members 110′ swing about bearing 501 which is pivotably mounted on axle 502. Tongue 120′ as integrally formed with depending members 110′ permits spring 112 to actuate fingers 121′.

Cartridge 90′ is mounted on cartridge base 503 which includes base plate 504, base side walls 506, ears 98′ mounted outboard on plate 504. Extending parallel to base 504 are guide pieces 507 including cartridge extensions 508 and belt hold down lips 509 which are insertable in opening 100′. The angled ends 511 of extensions 508 guide anti-retraction plate 122′.

Front sheath 40 carries eight (8) spacer tabs pairs 512, 513, 514, and 516. Cartridge 90 is held in its operative position by spring 517.

Figure 18:
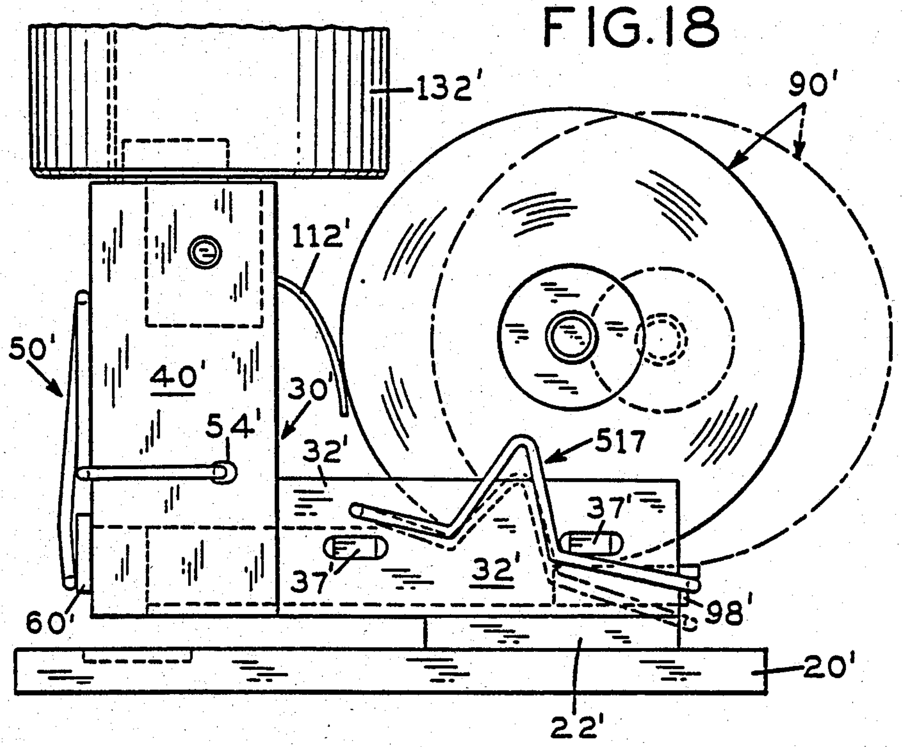
FIG. 18 is a side view of the stapler of FIG. 17.
Figure 19:
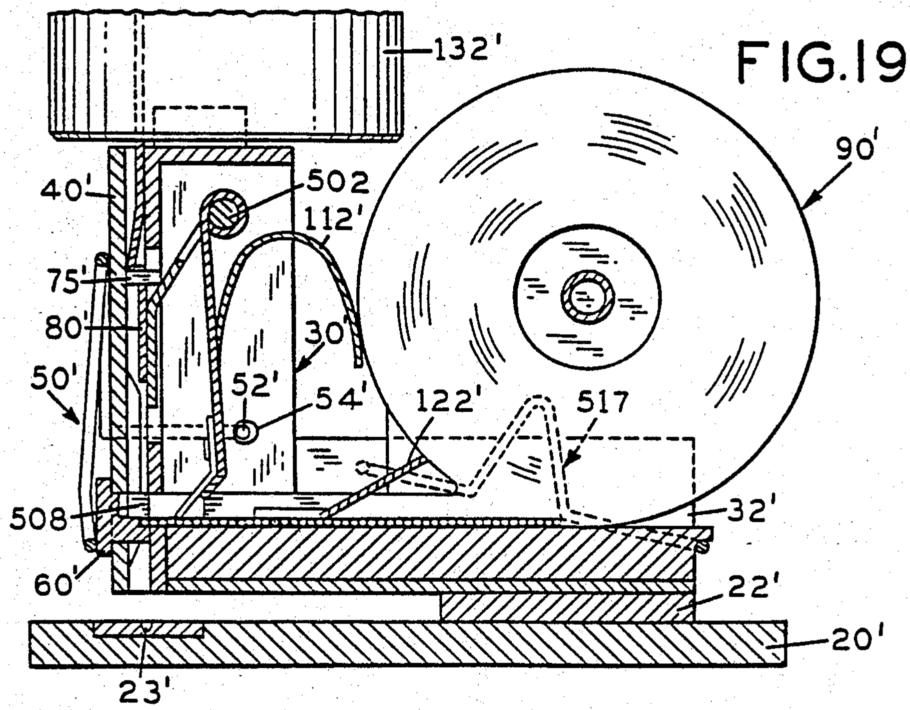
FIG. 19 is a elevational partial sectional view of the FIG. 17 stapler.
Figure 20:
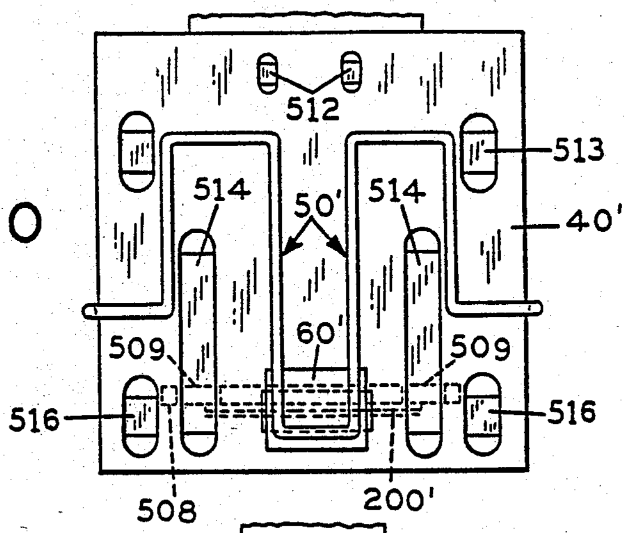
FIG. 20 is an end view of the modified stapler of FIG. 17.

In the operation of the modified stapler, cartridge 90 is placed in staplerhead 30′ as shown in FIG. 18 in dashed lines with spring 517 also shown in dashed lines in its down position. Cartridge 90′ is then pushed to the left against spring 112′, as shown in FIG. 18, until extensions 508 pass through opening 100′ and against sheath 40′. Opening 100′ is substantially larger than staple wire 200′. Extensions 508 are positioned between tabs 514 and 516 with portions of belt held down lips 509 also projecting through stapler head 30′ into the space between head 30 and sheath 40′. When the staple belt is advanced into the former 60′ the lead staple wire 200′ abuts tabs 514 to properly position staple wire 200′ in former 60′.

Figure 21:
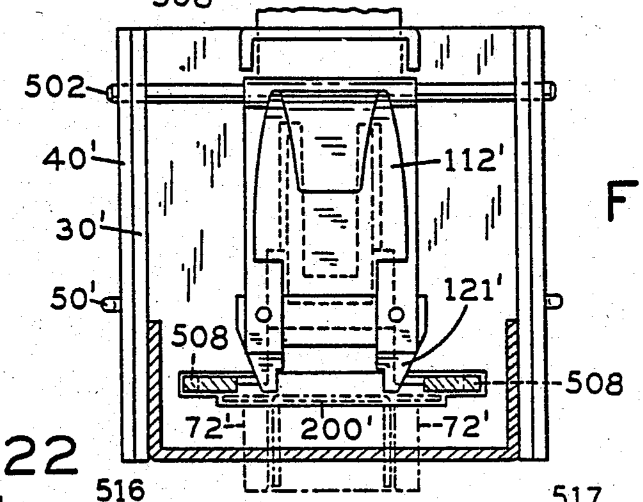
FIG. 21 is a vertical sectional view of the stapler of FIG. 17 including the cartridge positioned in opening 100 and showing the wire blank before and after forming.
Figure 22:
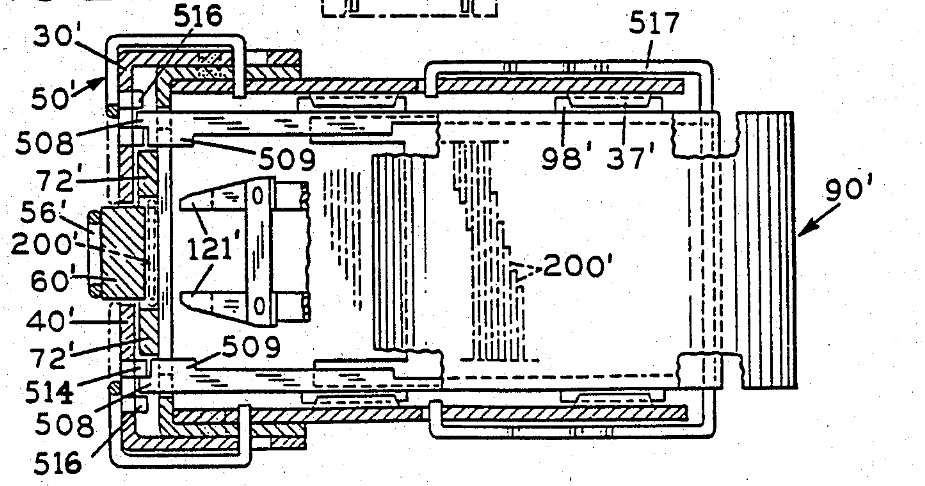
FIG. 22 is a plan view of the stapler of FIG. 17 showing the cartridge positioned for operation.

Referring to FIG. 21 it is seen that lead staple wire 200′ has its ends extending under lips 509 as it is fed into forming block 60′. Lips 509 function to prevent the lead staple wire of belt 94′ from being pushed upwardly on the upward stroke of the driver blade 86′ and former 70′ in the event the lead staple projects in part into the space between staple head 30′ and sheath 40′. It is thus seen that extensions 508, lips 509 and openings 100′ are shaped to cooperate among themselves to guide and hold the cartridge in position and to prevent a staple wire from being bent, deflected or removed from belt 94′ during the upward return stroke of blade 86′ and former 70′.

Lips 509 as positioned in opening 100′ form part of the border which defines an exit opening from which the lead staple 200′ exits the cartridge and enters former block 60.

I claim:

1. In a method of forming and driving staples through a workpiece and against an anvil in which side-by-side staple wires are fed from a staple wire belt which staple wire belt has a lead staple wire and in turn is led from a cartridge with a chute, the staples are formed and thereafter driven, the improvement comprising (a) urging the belt of staple wires along the cartridge chute into a forming means employing urging means which engage with the belt, thereafter;

(b) guiding the staple wire belt with such chute until the belt reaches the forming means;

(c) moving a driving means through a portion of its downward stroke which driving means carries with it a forming means; said driving means and forming means being positively engaged through engagement means;

(d) forming a staple by the downward movement of said engaged driving means and forming means to bend downwardly the ends of the staple wire;

(e) carrying said formed staple through action of the driving means further downward while said formed staple remains in and is guided by the forming means;

(f) disengaging the positive engagement means between the driving means and the forming means and thereafter causing the driving means to frictionally engage the forming means to carry such forming means downwardly with the driving means until the forming means strikes the workpiece at which time the frictional engagement of the forming means is overcome allowing the forming means to be arrested where it strikes the workpiece;

(g) striking the formed staple with said driving means to carry said formed staple still further downward and into the workpiece with said staple being in and guided by the forming means until the staple enters the workpiece; and (h) positioning the cartridge to be aligned with the forming means and continuously guiding that portion of the staple belt up to the lead staple of the belt.

2. The method of claim 1 in which the staple belt is urged against stop means to position the belt in the forming means.

3. In a method of forming and driving staples in which side-by-side staple wires are fed from a staple wire belt, the staples are formed and thereafter driven, the improvement comprising (a) urging the belt of staple wires into a forming means employing urging means which engage with the belt, thereafter;

(b) disengaging said urging means from said belt and upon such disengagement;

(c) moving a driving means through a portion of its downward stroke which driving means carries with it a forming means; said driving means and forming means being positively engaged through engagement means;

(d) forming a staple;

(e) carrying said formed staple through action of the driving means further downward while said formed staple remains and is guided by the forming means;

(f) disengaging the positive engagement means between the driving means and the forming means and thereafter causing the driving means to frictionally engage the forming means to carry such forming means downwardly with the driving means until the forming means strikes the workpiece at which time the frictional engagement of the forming means is overcome allowing the forming means to be arrested where it strikes the workpiece;

(g) striking a portion of the formed staple between the bent ends with said driving means to carry said formed staple still further downward and into the workpiece with said staple being in and guided by the forming means until the staple enters the workpiece; and (h) storing the staple belt in and feeding it from a cartridge unit which is aligned with the forming means and continuously guides that portion of the staple belt up to the lead staple of the belt.

* * * * *

UNITED STATES PATENT AND TRADEMARK OFFICE

CERTIFICATE OF CORRECTION

PATENT NO. : 4,583,276

DATED : April 22, 1986

INVENTOR(S) : Paul Olesen

It is certified that error appears in the above-identified patent and that said Letters Patent is hereby corrected as shown below:

Abstract - line 6, "distant" should read --distance--.

Column 3, line 20, "a" should read --an--.

Column 5, line 18, "antiretraction" should read --anti-retraction--.

Column 8, line 37, "initail" should read --initial--.

Column 9, line 11, "the" (first occurrence) should read --this--;

Column 10, line 12, "operatin" should read --operation--;

UNITED STATES PATENT AND TRADEMARK OFFICE
CERTIFICATE OF CORRECTION

PATENT NO. : 4,583,276

DATED : April 22, 1986

INVENTOR(S) : Paul Olesen

It is certified that error appears in the above-identified patent and that said Letters Patent is hereby corrected as shown below:

Column 11, line 28, "held down lips" should read --hold down lips--;

Column 12, line 18, "striking the" should read --striking a portion of the--;

line 18, "staple with" should read --staple between the bent ends with--;

line 43, "forming a staple;" should read --forming a staple by the downward movement of said engaged driving means and forming means to bend downwardly the ends of the staple wire;--.

Signed and Sealed this

Eighteenth Day of November, 1986

*Attest:*

DONALD J. QUIGG

*Attesting Officer* *Commissioner of Patents and Trademarks*